United States Patent
Shi (10) Patent No.: US 12,193,051 B2
(45) Date of Patent: Jan. 7, 2025

(54) METHOD FOR PROCESSING RANDOM ACCESS PROCEDURE, AND TERMINAL DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 348 days.

(21) Appl. No.: 17/842,767

(22) Filed: Jun. 16, 2022

(65) Prior Publication Data

US 2022/0322424 A1 Oct. 6, 2022

Related U.S. Application Data

(63) Continuation of application No. PCT/CN2019/127104, filed on Dec. 20, 2019.

(51) Int. Cl.
*H04W 74/04* (2009.01)
*H04L 1/1812* (2023.01)
*H04W 74/00* (2009.01)

(52) U.S. Cl.
CPC ........... *H04W 74/04* (2013.01); *H04L 1/1812* (2013.01); *H04W 74/004* (2013.01)

(58) Field of Classification Search
CPC ...... H04L 5/0032; H04L 5/00; H04W 72/542; H04W 72/23; H04W 8/04; H04W 8/24; H04W 16/14; H04W 72/1268
See application file for complete search history.

(56) References Cited

U.S. PATENT DOCUMENTS

2018/0176937 A1 6/2018 Chen et al.
2019/0182855 A1* 6/2019 Babaei ............ H04W 72/1268

FOREIGN PATENT DOCUMENTS

| CN | 107277923 | 10/2017 |
| CN | 110167152 | 8/2019 |
| WO | 2018198822 | 11/2018 |

OTHER PUBLICATIONS

3GPP, "3rd Generation Partnership Project; Technical Specification Group Radio Access Network; NR; Medium Access Control (MAC) protocol specification(Release 15)", 3GPP TS 38.321 V15.7.0, Sep. 2019, pp. 1-78.

(Continued)

*Primary Examiner* — Mahran Y Abu Roumi
(74) *Attorney, Agent, or Firm* — JCIP GLOBAL INC.

(57) ABSTRACT

The present application relates to a method for processing a random access procedure and a terminal device. The method is applied to a terminal device. In a non-contention random access procedure satisfying a predetermined condition, upon receipt of a random access response (RAR), if there is no data to be uplink transmitted, then no uplink transmission is performed. The embodiments of the present application are able to reduce unnecessary uplink transmission interference without affecting a random access procedure.

12 Claims, 6 Drawing Sheets

(56) References Cited

OTHER PUBLICATIONS

3GPP, "3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.7.0, Sep. 2019, pp. 1-134.
Huawei et al. , "Correction to HARQ buffer flushing in LTE", 3GPP TSG-RAN WG2 Meeting 102 R2-1808394, May 2018, pp. 1-4.
Nokia et al. , "UL Skipping for Beam Failure Recovery", 3GPP TSG-RAN WG2 Meeting #103 R2-1812026, Aug. 2018, pp. 1-4.
"International Search Report (Form PCT/ISA/210) of PCT/CN2019/127104", mailed on Sep. 24, 2020, with English translation thereof, pp. 1-7.
"Written Opinion of the International Searching Authority (Form PCT/ISA/237) ofPCT/CN2019/127104", mailed on Sep. 24, 2020, with English translation thereof, pp. 1-6.
Samsung, "UL grant in RAR for eLAA", 3GPP TSG-RAN WG2 Meeting #94 R2-163662, May 23-27, 2016, pp. 1-3.
"Search Report of of counterpart Europe application No. 19956249.7", issued on Nov. 7, 2022, p. 1-p. 8.

\* cited by examiner

METHOD FOR PROCESSING RANDOM ACCESS PROCEDURE, AND TERMINAL DEVICE

CROSS-REFERENCE TO RELATED APPLICATION

This application is a continuation of international PCT application serial no. PCT/CN2019/127104, filed on Dec. 20, 2019. The entirety of the above-mentioned patent application is hereby incorporated by reference herein and made a part of this specification.

TECHNICAL FIELD

The disclosure relates to the field of communications, and more particularly to a method for processing a random access procedure and a terminal device.

DESCRIPTION OF RELATED ART

Random access (RA) is an important step for establishing a communication link between a terminal device and a network device, and usually includes two random access methods, contention random access and non-contention random access. In the contention random access, different terminals may use the same resource to access a network, thereby resulting in resource contention. In the non-contention random access, a system may allocate specific resources to designated terminals for use, so there is no need for resource contention.

Usually, in some cases, a network side may trigger the non-contention random access procedure of the terminal device through manners such as high-level signaling. For example, when a terminal switches from a serving cell to a target cell, and the terminal does not obtain uplink synchronization and downlink data arrives, the non-contention random access procedure of the terminal device may be triggered.

However, according to conventional processing manners, in the non-contention random access procedure, when there is no need for uplink transmission of data, the terminal still sends data to the network side, which causes unnecessary uplink transmission interference.

SUMMARY

In view of the above, the embodiments of the disclosure provide a method for processing a random access procedure and a terminal device. Through canceling uplink transmission in a non-contention random access procedure, unnecessary uplink transmission interference can be reduced without affecting the random access procedure.

In a first aspect, an embodiment of the disclosure provides a method for processing a random access procedure, which is applied to a terminal device and includes the following. In a non-contention random access procedure satisfying a predetermined condition, after receiving a random access response (RAR), if there is no data to be uplink transmitted, uplink transmission is not performed.

According to the method for processing the random access procedure of the embodiment of the disclosure, the predetermined condition includes the following. The non-contention random access procedure is initiated by a physical downlink control channel (PDCCH) order.

According to the method for processing the random access procedure of the embodiment of the disclosure, the predetermined condition includes the following. The non-contention random access procedure is initiated by a PDCCH order, and a random access preamble index indicated in the PDCCH order is not zero.

According to the method for processing the random access procedure of the embodiment of the disclosure, a medium access control (MAC) entity of the terminal device is configured to have a function of ignoring uplink transmission.

According to the method for processing the random access procedure of the embodiment of the disclosure, not performing the uplink transmission includes the following. The terminal device ignores the uplink transmission for an uplink (UL) grant indicated to a hybrid automatic repeat request (HARQ) entity in the RAR.

According to the method for processing the random access procedure of the embodiment of the disclosure, the UL grant indicated to the HARQ entity in the RAR is addressed to a random access radio network temporary identifier (RA-RNTI).

According to the method for processing the random access procedure of the embodiment of the disclosure, the method further includes the following. In response to the non-contention random access procedure triggered by a network device, the terminal device sends a random access preamble to the network device. The RAR sent by the network device is received. A random access preamble identifier in the received RAR being consistent with a preamble index corresponding to the random access preamble sent to the network devices is determined.

According to the method for processing the random access procedure of the embodiment of the disclosure, the MAC entity of the terminal device is configured to have a skipUplinkTxDynamic field, and a value corresponding to the field is true.

According to the method for processing the random access procedure of the embodiment of the disclosure, the method further includes the following. The MAC entity of the terminal device does not generate a MAC protocol data unit (PDU) for the HARQ entity.

According to the method for processing the random access procedure of the embodiment of the disclosure, the data to be uplink transmitted includes uplink data, MAC CE, and/or padding data that the terminal device needs to send.

In a second aspect, an embodiment of the disclosure also provides a method for processing a random access procedure, which is applied to a terminal device. A MAC entity of the terminal device is configured to have a skipUplinkTxDynamic field, and a value of the field is true. The method includes the following. In the random access procedure initiated by a PDCCH order whose random access preamble index is not zero, when a UL grant indicated to an HARQ entity is addressed to an RA-RNTI, the MAC entity of the terminal device does not generate a MAC PDU for the HARQ entity.

In a third aspect, an embodiment of the disclosure also provides a terminal device, which includes an uplink transmission processing unit. The uplink transmission processing unit is configured to, in a non-contention random access procedure satisfying a predetermined condition, after receiving a random access response (RAR), if there is no data to be uplink transmitted, not perform uplink transmission.

According to the terminal device of the embodiment of the disclosure, the predetermined condition includes the following. The non-contention random access procedure is initiated by a physical downlink control channel (PDCCH) order.

According to the terminal device of the embodiment of the disclosure, the predetermined condition includes the following. The non-contention random access procedure is initiated by the PDCCH order, and a random access preamble index indicated in the PDCCH order is not zero.

According to the terminal device of the embodiment of the disclosure, the medium access control (MAC) entity of the terminal device is configured to have a function of ignoring uplink transmission.

According to the terminal device of the embodiment of the disclosure, the uplink transmission processing unit not performing the uplink transmission includes the following. The uplink transmission processing unit ignores the uplink transmission for an uplink (UL) grant indicated to a hybrid automatic repeat request (HARQ) entity in the RAR.

According to the terminal device of the embodiment of the disclosure, the UL grant indicated to the HARQ entity in the RAR is addressed to a random access radio network temporary identifier (RA-RNTI).

According to the terminal device of the embodiment of the disclosure, the terminal device further includes a preamble sending unit, configured to send a random access preamble to the network device in response to the non-contention random access procedure triggered by the network device; an RAR receiving unit, configured to receive the RAR sent by the network device; a preamble determining unit, configured to determine that a random access preamble identifier in the RAR received by the RAR receiving unit is consistent with a preamble index corresponding to the random access preamble sent by the preamble sending unit to the network device.

According to the terminal device of the embodiment of the disclosure, the MAC entity of the terminal device is configured to have a skipUplinkTxDynamic field, and a value corresponding to the field is true.

According to the terminal device of the embodiment of the disclosure, the terminal device further includes a control unit, configured to enable the MAC entity of the terminal device to not generate a MAC protocol data unit (PDU) for the HARQ entity.

According to the terminal device of the embodiment of the disclosure, the data to be uplink transmitted includes uplink data, MAC CE, and/or padding data that the terminal device needs to send.

In a fourth aspect, an embodiment of the disclosure further provides a terminal device. A MAC entity of the terminal device is configured to have a skipUplinkTxDynamic field, and a value of the field is true. The terminal device includes a control unit, configured to, in a random access procedure initiated by a PDCCH order whose random access preamble index is not zero, when a UL grant indicated to an HARQ entity is addressed to an RA-RNTI, enable the MAC entity of the terminal device to not generate a MAC PDU for the HARQ entity.

In a fifth aspect, an embodiment of the disclosure provides a terminal device, which includes a processor and a memory. The memory is configured to store a computer program. The processor calls and runs the computer program stored in the memory to execute the steps of the method for processing the random access procedure.

In a sixth aspect, an embodiment of the disclosure also provides a chip, which includes a processor, configured to call and run a computer program from a memory, so that a device installed with the chip executes the steps of the method for processing the random access procedure.

In a seventh aspect, an embodiment of the disclosure further provides a computer-readable storage medium, configured to storing a computer program. The computer program enables a computer to execute the steps of the method for processing the random access procedure.

In an eighth aspect, an embodiment of the disclosure further provides a computer program product, which includes a computer program instruction. The computer program instruction enables a computer to execute the steps of the method for processing the random access procedure.

In a ninth aspect, an embodiment of the disclosure further provides a computer program. The computer program enables a computer to execute the steps of the method for processing the random access procedure.

In a tenth aspect, an embodiment of the disclosure further provides a communication system, which includes a terminal device and a network device. The terminal device is configured to execute the steps of the method for processing the random access procedure.

In the embodiments of the disclosure, through canceling the uplink transmission in the non-contention random access procedure satisfying the condition, unnecessary uplink transmission interference can be reduced without affecting the random access procedure, and the power consumption of the terminal device can be reduced to a certain extent.

DETAILED DESCRIPTION OF DISCLOSED EMBODIMENTS

The technical solutions in the embodiments of the disclosure will be described below in conjunction with the drawings in the embodiments of the disclosure.

The technical solutions in the embodiments of the disclosure may be applied to various communication systems, such as a global system of mobile communication (GSM)

system, a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of the NR system, an LTE-based access to unlicensed spectrum (LTE-U) system, an NR-based access to unlicensed spectrum (NR-U) system, a universal mobile telecommunication system (UMTS), wireless local area networks (WLAN), wireless fidelity (WiFi), a next-generation (5th-generation, 5G) communication system, or other communication systems.

Generally speaking, the traditional communication system supports a limited number of connections and is easy to implement. However, with the development of communication technology, the mobile communication system not only supports traditional communication, but also supports, for example, device to device (D2D) communication, machine to machine (M2M) communication, machine type communication (MTC), vehicle to vehicle (V2V) communication, etc. The embodiments of the disclosure may also be applied to the communication systems.

Optionally, the communication system in the embodiments of the disclosure may be applied to a carrier aggregation (CA) scenario, a dual connectivity (DC) scenario, and a standalone (SA) networking scenario.

The embodiments of the disclosure are described in combination with a terminal device and a network device. The terminal device may also be referred to as a user equipment (UE), an access terminal, a user unit, a user station, a mobile station, a mobile platform, a remote station, a remote terminal, a mobile device, a user terminal, a terminal, a wireless communication device, a user agent, a user apparatus, etc. The terminal device may be a station (ST) in a WLAN, a cellular phone, a cordless phone, a session initiation protocol (SIP) phone, a wireless local loop (WLL) station, a personal digital assistant (PDA) device, a handheld device with a wireless communication function, a computing device, other processing devices connected to a wireless modulator-demodulator, an on-board device, a wearable device, and a next-generation communication system, such as a terminal device in an NR network or a terminal device in a future evolution of a public land mobile network (PLMN).

As an example and not a limitation, in the embodiment of the disclosure, the terminal device may also be a wearable device. The wearable device may also be referred to as a wearable smart device, which is a general term for a wearable device developed by applying wearable technology to intelligently design daily wear, such as glasses, gloves, watches, clothing, and shoes. The wearable device is a portable device that is directly worn on the body or integrated into clothes or accessories of the user. The wearable device is not only a hardware device, but also implements powerful functions through software support, data interaction, and cloud interaction. In a broad sense, the wearable smart device includes, for example, a smart watch, smart glasses, etc., that is full-featured, large-sized, may implement complete or partial functions without relying on smart phones, and various smart bracelets, smart jewelries, etc. for monitoring physical signs that only focus on a certain type of application function and need to be used in cooperation with other devices, such as smart phones.

The network device may be a device used to communicate with a mobile device. The network device may be an access point (AP) in WLAN, a base transceiver station (BTS) in GSM or CDMA, a node B (NB) in WCDMA, an evolutional node B (eNB or eNodeB), a relay station, or an access point in LTE, a generation node B (gNB) in an on-board device, a wearable device, and an NR network, a network device in a future evolution of a PLMN, etc.

In the embodiment of the disclosure, the network device provides services for a cell. The terminal device communicates with the network device through a transmission resource (for example, a frequency domain resource or a spectrum resource) used by the cell. The cell may be a cell corresponding to the network device (for example, a base station). The cell may belong to a macro base station or a base station corresponding to a small cell. The small cell may include a metro cell, a micro cell, a pico cell, a femto cell, etc. The small cells have the characteristics of small coverage range and low emission power and are suitable for providing high-speed data transmission services.

Figure 1:
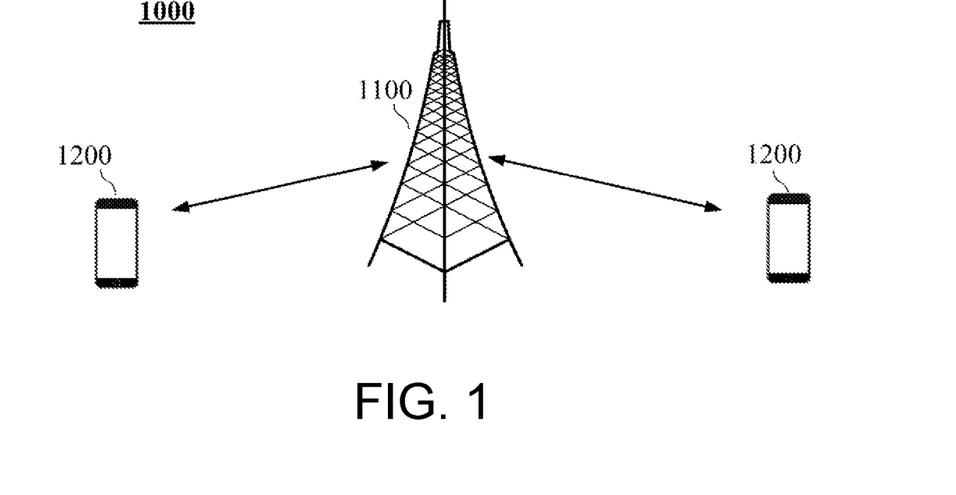
FIG. 1 is a schematic diagram of an architecture of a communication system according to an embodiment of the disclosure.

FIG. 1 schematically shows a network device 1100 and two terminal devices 1200. Optionally, a wireless communication system 1000 may include multiple network devices 1100, and the coverage range of each network device 1100 may include other numbers of terminal devices, which is not limited in the embodiment of the disclosure.

Optionally, the wireless communication system 1000 shown in FIG. 1 may further include other network entities such as a mobility management entity (MME) and an access and mobility management function (AMF), which is not limited in the embodiment of the disclosure.

It should be understood that the terms "system" and "network" in the disclosure are often used interchangeably. The term "and/or" in the disclosure is only used to describe an association relationship of associated objects, which represents that there may be three types of relationships. For example, A and/or B may represent the three situations that A exists alone, A and B exist at the same time, and B exists alone. In addition, the sign "/" in the disclosure generally represents that the previous and next associated objects are in an "or" relationship.

Figure 2:
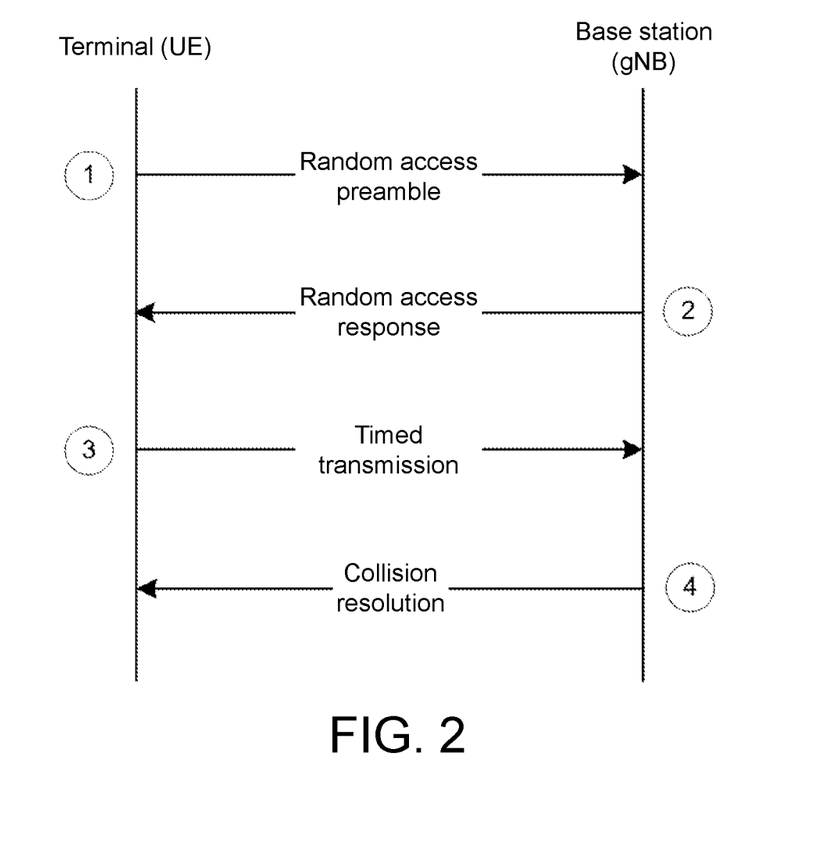
FIG. 2 is a schematic flowchart of a contention random access procedure in a communication system.
Figure 3:
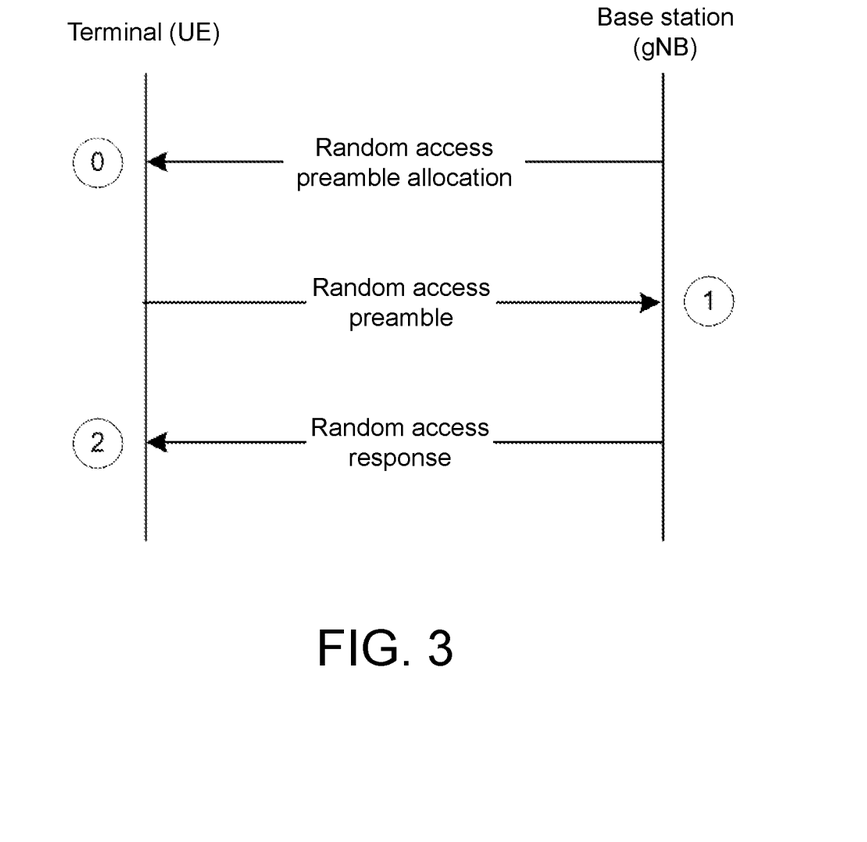
FIG. 3 is a schematic flowchart of a non-contention random access procedure in a communication system.

In order to clearly illustrate the concepts of the embodiments of the disclosure, a random access procedure in a communication system is briefly described first. FIG. 2 and FIG. 3 are respectively schematic diagrams of a contention random access procedure and a non-contention random access procedure in an NR system.

For the contention random access procedure shown in FIG. 2, the general steps are as follows:

Firstly, a terminal device (UE) sends a first step message (Msg1).

Specifically, the terminal device selects a physical random access channel (PRACH) resource, and sends a selected random access preamble, sometimes referred to as a preamble, on a selected PRACH time-frequency resource. Based on the preamble, the network device, such as a base station (gNB), may estimate the size of an uplink (UL) grant required by the terminal device to send a third step message (Msg3).

Secondly, the base station sends a second step message (Msg2).

Specifically, after the terminal device sends the Msg1, a window may be opened. A physical downlink control channel (PDCCH) may be monitored in the window. The PDCCH is scrambled with a random access radio network temporary identifier (RA-RNTI). The RA-RNTI is related to the PRACH time-frequency resource selected by the terminal device.

After the terminal device successfully monitors the PDCCH scrambled with the RA-RNTI, the terminal device can obtain a physical downlink shared channel (PDSCH)

scheduled by the PDCCH to receive a random access response (RAR) corresponding to the RA-RNTI.

The RAR in the Msg2 generally has the following characteristics.

① A subheader of the RAR includes a backoff indicator (BI), and the BI is configured to indicate the time that the terminal device needs to wait before retransmitting the first step message, that is, the backoff time;

② the RAR includes a random access preamble identifier (RAPID), and the RAPID is a response of a network to the preamble index corresponding to the received preamble;

③ a payload of the RAR includes a timing advance of GSM (TAG), and the TAG is configured to adjust an uplink timing;

④ the RAR includes a UL grant, which is an uplink resource indicator for scheduling the terminal device to send the third step message;

⑤ the RAR includes a temporary cell RNTI (TC-RNTI), and the TC-RNTI is configured to scramble the PDCCH of the fourth step message (Msg4).

Again, the terminal device sends the third step message (Msg3).

Specifically, the Msg3 may inform the base station which event triggers the random access procedure. For example, for an initial random access procedure, the Msg3 may carry a terminal device identifier (UE ID) and an establishment cause of a radio resource control (RRC). For re-establishment of the RRC, the Msg3 may carry the UE ID in a connected state and the establishment cause.

Finally, the base station sends a fourth step message (Msg4).

Specifically, since contention random access is that the terminal device randomly selects the preamble for random access, different terminal devices may select the same preamble of the same PRACH resource at the same time, thereby causing collision. On the one hand, the Msg4 is configured to resolve contention collision, and on the other hand, the Msg4 is configured to transmit an RRC configuration message to the terminal device to establish an RRC connection.

In the random access procedure, if the terminal device does not use a randomly selected preamble for random access, but uses a dedicated preamble, such as the dedicated preamble allocated by the base station for the terminal device, for random access, no contention collision will be caused between the terminal device and other terminal devices, so there is no need to resolve contention collision.

In the art, the random access procedure in which the dedicated preamble is allocated by the base station is the non-contention random access procedure. Referring to FIG. 3, the non-contention random access procedure roughly includes the following. Firstly, the base station allocates the dedicated preamble for the terminal device. Secondly, the terminal device sends the preamble to the base station. Then, the base station sends the RAR to the terminal device, the terminal device adjusts uplink synchronization based on a timing advance of GSM (TAG) in the RAR, and the non-contention random access procedure ends.

It should be noted that in the non-contention random access procedure, except that the preamble is allocated by the network device (rather than randomly selected by the terminal device) and contention collision does not need to be resolved, part of the non-contention random access procedure is the same as the contention random access procedure, and issues arise accordingly in practical applications. A detailed description is given below.

For example, according to the conventional processing manner, regardless of the non-contention random access procedure or the contention random access procedure, after receiving the preamble, the network device schedules a RAR message through the PDCCH scrambled with the RA-RNTI to be sent to the terminal device. The RAR message includes not only the value of the TAG, the TC-RNTI, but also the UL grant. As mentioned above, the UL grant in the RAR is the uplink resource indicator for scheduling the terminal device to send the Msg3.

In this regard, on the one hand, in the contention random access procedure, the terminal device needs to use the UL grant in the RAR to send the Msg3, wherein the Msg3 includes at least a cell RNTI (C-RNTI) and a medium access control (MAC) control element (CE).

On the other hand, in the non-contention random access procedure, similar to the contention random access procedure, the terminal device uses the UL grant in the RAR to send data, and the difference is that since in the non-contention random access procedure, the terminal device does not need to send the Msg3 (for example, the C-RNTI or the MAC CE) to the network device after receiving the RAR, it is specified here that the terminal device sends a padding data packet to the network through the UL grant, but the padding data packet does not carry any useful data.

This means that even when the terminal device itself has no uplink data or MAC CE to be sent, the terminal device still needs to send meaningless data on the UL grant. Such processing manner not only increases the power consumption burden of the terminal device, but also increases unnecessary uplink transmission interference to the system due to uploading useless data. The processing manner of the conventional random access procedure needs to be optimized.

Figure 4:
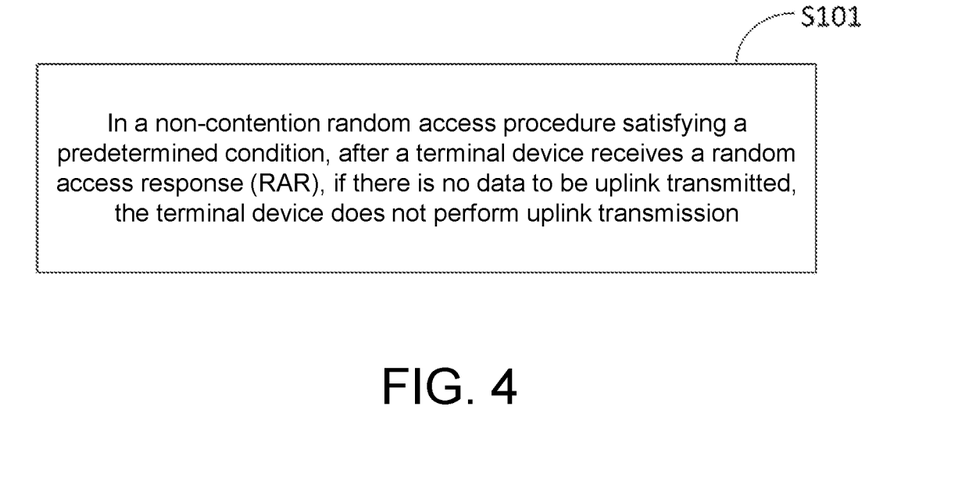
FIG. 4 is a flowchart of a method for processing a random access procedure according to an embodiment of the disclosure.

As such, an embodiment of the disclosure provides a method for processing a random access procedure. Referring to FIG. 4, the method includes the following.

In S101, in a non-contention random access procedure satisfying a predetermined condition, after receiving a random access response (RAR), if there is no data to be uplink transmitted, uplink transmission is not performed.

Using the solution of the embodiment of the disclosure, in some non-contention random access procedures, the terminal device may not perform uplink transmission after receiving the RAR, which enables the terminal device to selectively perform uplink transmission or not perform uplink transmission. Especially when there is no content requiring uplink transmission, uplink transmission is determined to be not performed, thereby reducing unnecessary uplink transmission interference and saving the power consumption of the terminal device.

In the embodiment of the disclosure, the predetermined condition may be that the non-contention random access procedure is initiated by a physical downlink control channel (PDCCH) order.

In an embodiment, when the terminal device loses uplink synchronization and downlink data arrives, the base station triggers the random access procedure through the PDCCH order, wherein the PDCCH order may carry a non-zero preamble index indicated as a dedicated preamble. Then, the non-contention random access procedure is entered.

In another embodiment, the PDCCH order may also carry an all-zero preamble index, which represents a non-dedicated preamble. At this time, since the terminal device is not allocated with a dedicated preamble, contention for access is still required, so the contention random access procedure begins.

In the embodiment of the disclosure, the predetermined condition may be that the non-contention random access procedure is initiated by the PDCCH order, and the preamble index indicated in the PDCCH order is not zero.

Specifically, in the non-contention random access procedure initiated by the PDCCH order, if the preamble index allocated to the terminal device is not zero, the terminal device uses the allocated preamble for non-contention random access at this time. In the procedure, after receiving the RAR, the terminal device does not need to further uplink transmit the Msg3 or other messages, which means that if uplink transmission occurs at this time, the uplink transmission may be determined to be unnecessary and useless.

Therefore, in the non-contention random access procedure initiated by the PDCCH order carrying the non-zero preamble index, after receiving the RAR, the terminal device of the embodiment of the disclosure has two possible processing manners.

Manner 1: if there is no uplink transmission data to be sent in the terminal device itself, uplink transmission will not be performed. In this way, the normal communication of the system will not be affected, and the interference caused by uplink transmission can be minimized.

Manner 2: if the terminal device itself has content that needs to be uplink transmitted, such as uplink data and/or MAC CE to be sent, uplink transmission is performed to maintain the normal communication of the system.

Further, in order to implement "not performing the uplink transmission", various means may be adopted. In the embodiment of the disclosure, the MAC entity of the terminal device is configured to have a function of ignoring uplink transmission (UL skipping) to allow the terminal device to ignore (also referred to as skipping, cancelling, disabling, etc.) the step of uplink transmission in some cases.

In the embodiment of the disclosure, for the terminal device configured and enabled with the function of UL skipping, in order to minimize uplink transmission interference without affecting the normal communication of the system, the terminal device ignores the uplink transmission for a UL grant indicated to the hybrid automatic repeat request (HARQ) entity in the RAR.

In other words, in the embodiment of the disclosure, in the non-contention random access procedure initiated by the PDCCH order carrying the non-zero preamble index, after the terminal device with the function of UL skipping receives the RAR, the terminal device does not perform uplink transmission for a UL grant resource indicated to the HARQ entity in the RAR.

Compared with the conventional processing manner in which the padding data packet must be uploaded in the non-contention random access procedure, the terminal device of the embodiment of the disclosure actually ignores, skips, or cancels the step of uplink transmission here, which can avoid unnecessary uplink interference, and this can also save power for the terminal device to improve the battery life of the terminal device.

In the embodiment of the disclosure, the UL grant indicated to the HARQ entity in the RAR received by the terminal device is addressed to the RA-RNTI.

Figure 5:
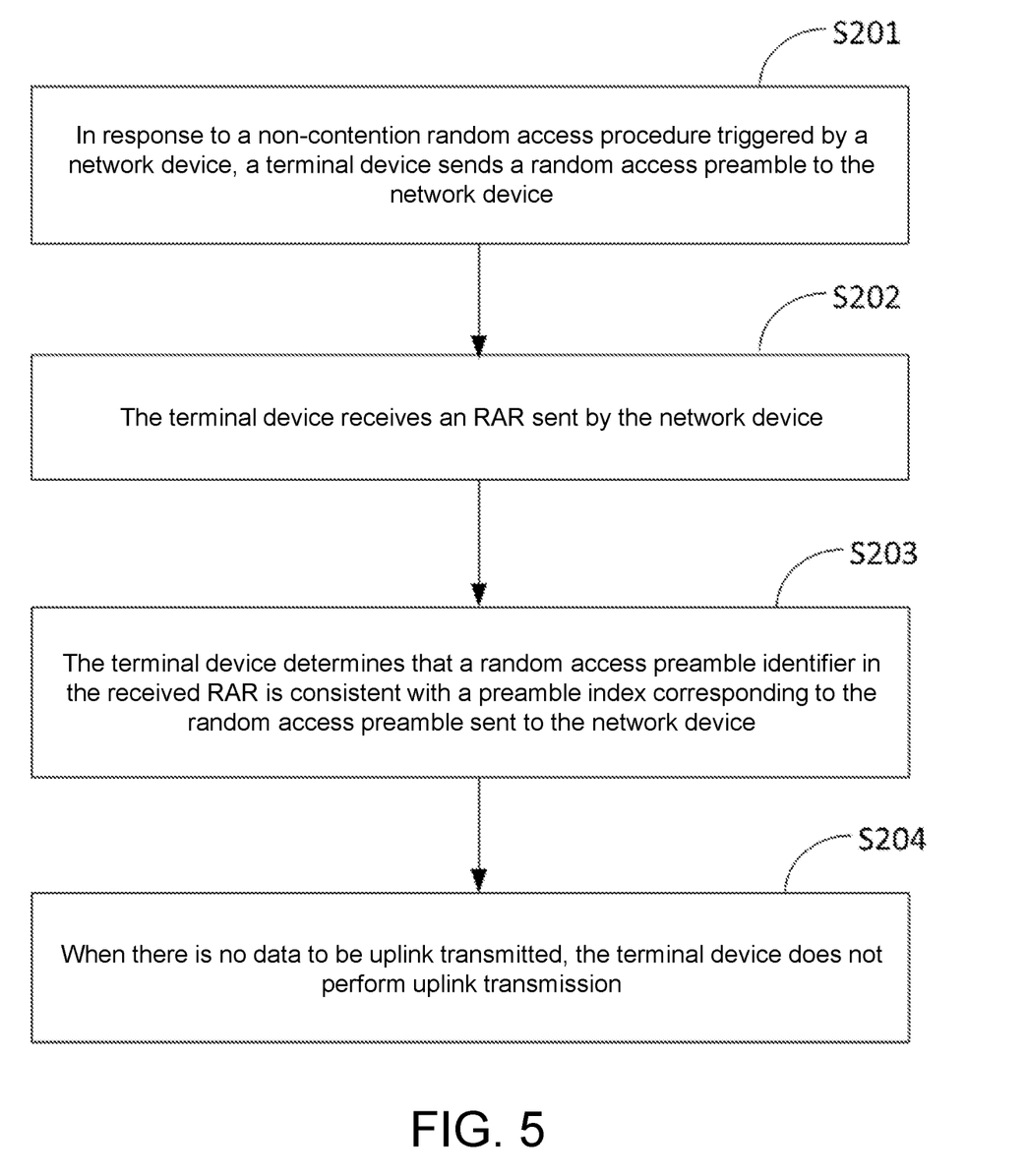
FIG. 5 is a flowchart of a method for processing a random access procedure according to another embodiment of the disclosure.

Referring to FIG. 5, which is a flowchart of a method for processing a random access procedure according to an embodiment of the disclosure and includes the following.

In S201, in response to a non-contention random access procedure triggered by a network device, a terminal device sends a random access preamble to the network device.

In S202, the terminal device receives an RAR sent by the network device.

In S203, the terminal device determines that a random access preamble identifier (RAPID) in the received RAR is consistent with a preamble index corresponding to the random access preamble sent to the network device.

In S204, when there is no data to be uplink transmitted, the terminal device does not perform uplink transmission.

Specifically, in response to the non-contention random access procedure triggered by the network device, after the terminal device receives the preamble index allocated by the network device, the terminal device sends the corresponding preamble to the network device. After receiving the preamble, the network device schedules the RAR through a PDCCH scrambled with an RA-RNTI, and sends the RAR to the terminal device.

For the terminal device, after sending the preamble, the RAR sent to itself may be detected through monitoring the PDCCH scrambled with the RA-RNTI to determine that the RAPID in the RAR is consistent with the preamble index corresponding to the preamble sent by the terminal device. In this case, the UL grant indicated to the HARQ entity in the RAR is addressed to the RA-RNTI. For the UL grant indicated to the HARQ entity, the terminal device of the embodiment of the disclosure performs uplink transmission on the UL grant when there is uplink data and/or MAC CE to be sent, and ignores (skips) uplink transmissions when there is no uplink data or MAC CE to be sent.

Here, further, according to the conventional processing manner, even if there is no uplink requirement, the MAC entity of the terminal device needs to generate a MAC protocol data unit (PDU) for the HARQ entity, and execute uplink transmission, such as uplink sending a padding data packet on the channel after receiving the UL grant indicated in the RAR. In the embodiment of the disclosure, in the non-contention random access procedure satisfying the condition, when there is no other uplink requirement, even if the terminal device receives the UL grant indicated in the RAR, the terminal device will not execute uplink transmission on the UL grant, so the terminal device does not need to generate the MAC PDU.

Therefore, in order to avoid generating redundant data, the embodiment of the disclosure further specifies that the MAC entity of the terminal device does not generate the MAC PDU for the HARQ entity. The structure of the MAC PDU may generally include four parts, a MAC header, a MAC service data unit (SDU), a MAC CE, and/or padding. In an embodiment of the disclosure, the terminal device does not need to uplink transmit any data, so padding data is not required, that is, the terminal device does not need to generate the padding data as padding, so the terminal device generates zero padding data.

Specific implementations of the embodiment of the disclosure are described below based on specific embodiments.

The MAC entity shall not generate a MAC PDU for the HARQ entity if the following conditions are satisfied:
  the MAC entity is configured to have skipUplinkTxDynamic with value true and the grant indicated to the HARQ entity was addressed to a C-RNTI, or the grant indicated to the HARQ entity is a configured uplink grant, or the grant indicated to the HARQ entity was addressed to a RA-RNTI and the Random Access procedure was initiated by a PDCCH order with ra-PreambleIndex different from 0b000000; and
  there is no aperiodic CSI requested for this PUSCH transmission as specified in TS 38.212 [9]; and
  the MAC PDU includes zero MAC SDUs; and the MAC PDU includes only the periodic BSR and there is no data available for any LCG, or the MAC PDU includes only the padding BSR.

In detail, firstly, in the embodiment of the disclosure, the network device may configure a preset field for the MAC entity of the designated terminal device, so that the terminal device has the capability of ignoring uplink transmission, that is, UL skipping. When the value of the preset field is set to true, the function of UL skipping is enabled.

In an embodiment, the preset field is a "skipUplinkTx-Dynamic" field. When the MAC entity of the terminal device is configured to have the "skipUplinkTxDynamic" field, and the value of the field is true, the method for processing the random access procedure includes the following. In the random access procedure initiated by the PDCCH order whose random access preamble index is not zero, when the UL grant indicated to the HARQ entity is addressed to the RA-RNTI, the MAC entity of the terminal device does not generate the MAC PDU for the HARQ entity.

It means that the MAC entity of the terminal device will not generate the MAC PDU for the HARQ entity if the following conditions are satisfied.

The MAC entity of the terminal device is configured to have the "skipUplinkTxDynamic" field, the value of the field is true, the UL grant indicated to the HARQ entity is addressed to the RA-RNTI, and the random access procedure is initiated by the PDCCH order whose random access preamble index is not zero.

The specific settings and implementations of the embodiments of the disclosure have been described above through multiple embodiments in different perspectives. Using at least one of the above embodiments, in the random access procedure initiated by the PDCCH order whose random access preamble index is not zero, if the terminal device has no uplink data or MAC CE to be sent, for the UL grant indicated in the RAR, the terminal device may skip uplink transmission and also does not generate the corresponding MAC PDU. In this way, the power consumption of the terminal device can be saved while reducing unnecessary uplink transmission interference caused by uploading useless data.

Figure 6:
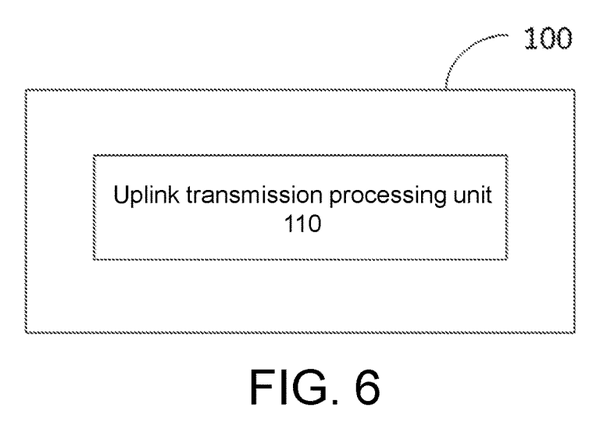
FIG. 6 is a schematic structural block diagram of a terminal device according to an embodiment of the disclosure.

Corresponding to the processing method of at least one of the above embodiments, an embodiment of the disclosure further provides a terminal device 100. Referring to FIG. 6, the terminal device 100 includes an uplink transmission processing unit 110.

The uplink transmission processing unit 110 is configured to, in a non-contention random access procedure satisfying a predetermined condition, after receiving a random access response (RAR), if there is no data to be uplink transmitted, not perform uplink transmission.

Optionally, in the embodiment of the disclosure, the predetermined condition includes that the non-contention random access procedure is initiated by a physical downlink control channel (PDCCH) order.

Optionally, in the embodiment of the disclosure, the predetermined condition includes that the non-contention random access procedure is initiated by the PDCCH order, and a random access preamble index indicated in the PDCCH order is not zero.

Optionally, in the embodiment of the disclosure, a medium access control (MAC) entity of the terminal device is configured to have a function of ignoring uplink transmission.

Optionally, in the embodiment of the disclosure, the uplink transmission processing unit not performing the uplink transmission includes that the uplink transmission processing unit ignores the uplink transmission for an uplink (UL) grant indicated to an HARQ entity in the RAR.

Optionally, in the embodiment of the disclosure, the UL grant indicated to the HARQ entity in the RAR is addressed to a random access radio network temporary identifier (RA-RNTI).

Figure 7:
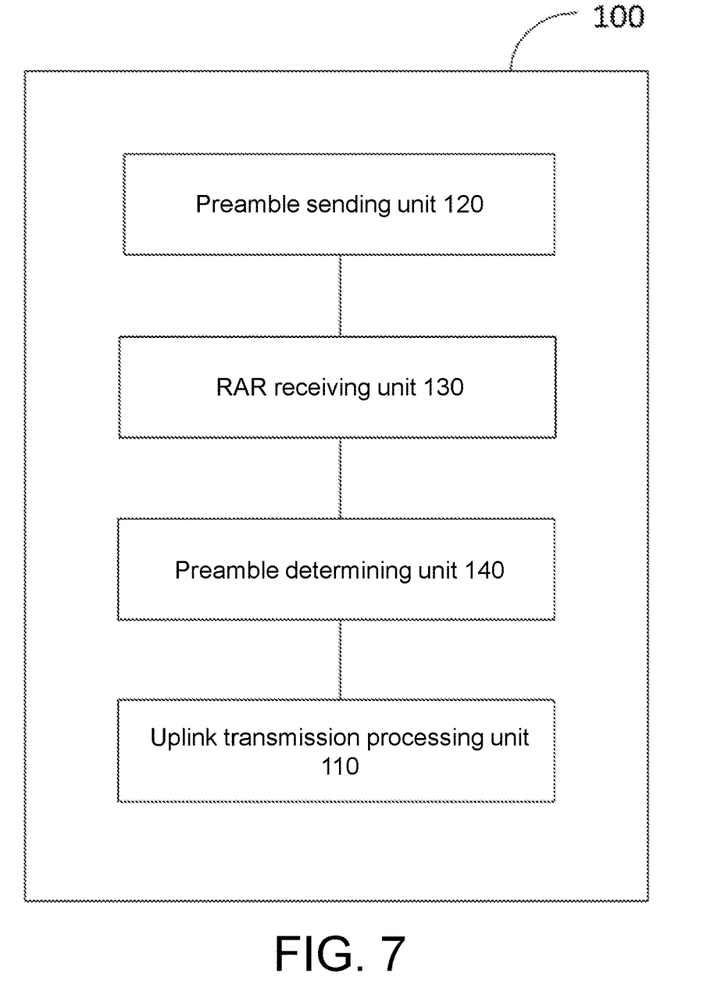
FIG. 7 is a schematic structural block diagram of a terminal device according to another embodiment of the disclosure.

Optionally, in the embodiment of the disclosure, referring to FIG. 7, the terminal device 100 further includes the following.

A preamble sending unit 120 is configured to send the random access preamble to the network device in response to the non-contention random access procedure triggered by the network device.

An RAR receiving unit 130 is configured to receive the RAR sent by the network device.

A preamble determining unit 140 is configured to determine that the random access preamble identifier in the RAR received by the RAR receiving unit is consistent with the preamble index corresponding to the random access preamble sent by the preamble sending unit to the network device.

Optionally, in the embodiment of the disclosure, the MAC entity of the terminal device is configured to have the skipUplinkTxDynamic field, and the value corresponding to the field is true.

Figure 8:
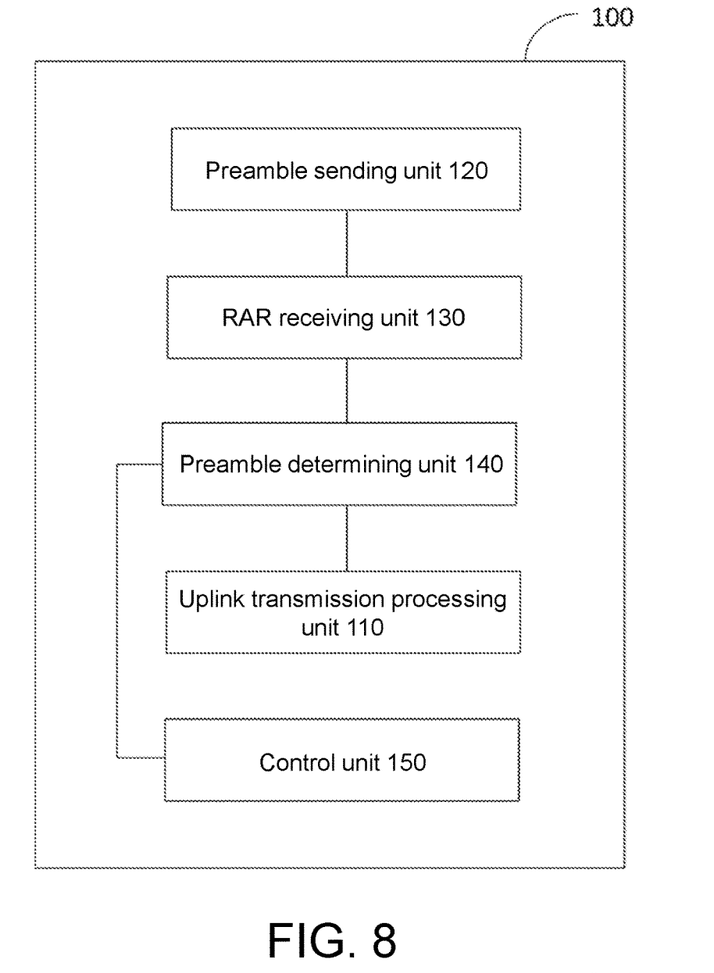
FIG. 8 is a schematic structural block diagram of a terminal device according to yet another embodiment of the disclosure.

Optionally, in the embodiment of the disclosure, referring to FIG. 8, the terminal device 100 further includes the following.

A control unit 150 is configured to enable the MAC entity of the terminal device to not generate the MAC protocol data unit (PDU) for the HARQ entity.

Optionally, in the embodiment of the disclosure, the data to be uplink transmitted includes uplink data, MAC CE, and/or padding data that the terminal device needs to send.

Figure 9:
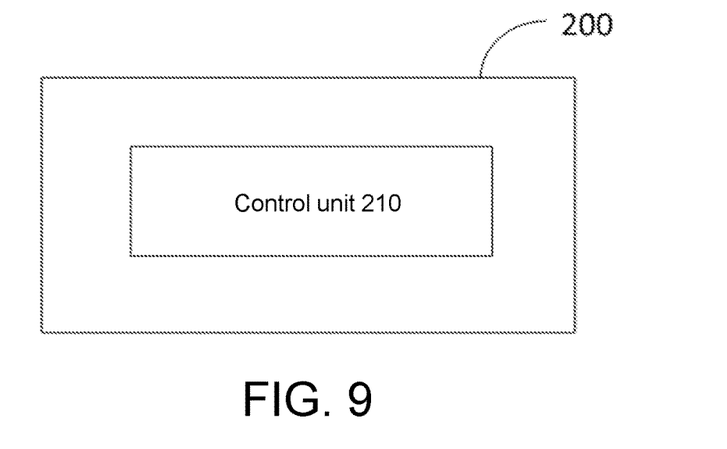
FIG. 9 is a schematic structural block diagram of a terminal device according to still another embodiment of the disclosure.

Corresponding to the processing method of at least one of the above embodiments, an embodiment of the disclosure further provides a terminal device 200. A MAC entity of the terminal device 200 is configured to have a skipUplinkTx-Dynamic field, and the value of the field is true.

Referring to FIG. 9, the terminal device 200 includes the following.

A control unit 210 is configured to, in a random access procedure initiated by a PDCCH order whose random access preamble index is not zero, enable the MAC entity of the terminal device 200 to not generate a MAC PDU for an HARQ entity.

Using the terminal device of the embodiment of the disclosure, uplink transmission in the non-contention random access procedure satisfying the condition can be cancelled, unnecessary uplink transmission interference can be reduced without affecting the random access procedure, and the power consumption of the terminal device can be reduced to a certain extent.

Figure 10:
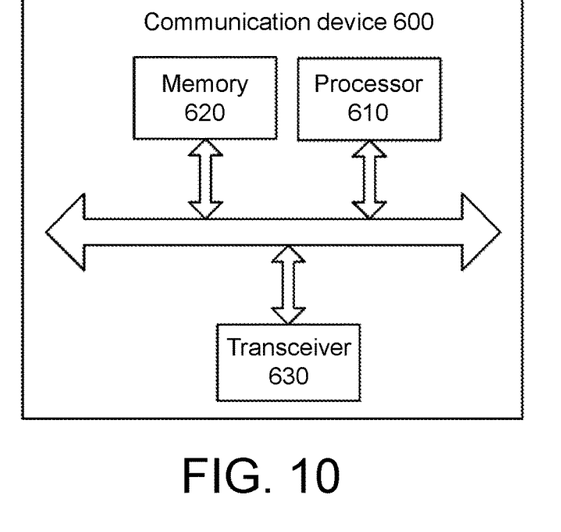
FIG. 10 is a schematic block diagram of a communication device according to an embodiment of the disclosure.

FIG. 10 is a schematic structural diagram of a communication device 600 according to an embodiment of the disclosure. The communication device 600 shown in FIG. 6 includes a processor 610. The processor 610 may call and run a computer program from a memory to implement the method in the embodiment of the disclosure.

Optionally, as shown in FIG. 10, the communication device 600 may further include a memory 620. The processor 610 may call and run a computer program from the memory 620 to implement the method in the embodiment of the disclosure.

The memory 620 may be a separate device independent of the processor 610 or may be integrated in the processor 610.

Optionally, as shown in FIG. 10, the communication device 600 may also include a transceiver 630. The processor 610 may control the transceiver 630 to communicate with other devices, specifically, to send information or data to other devices or receive information or data sent by other devices.

The transceiver 630 may include a transmitter and a receiver. The transceiver 630 may further include an antenna. The number of the antenna may be one or more.

Optionally, the communication device 600 may be the network device of the embodiment of the disclosure, and the communication device 600 may implement the corresponding procedure implemented by the network device in each method of the embodiment of the disclosure, which is not repeated here for brevity.

Optionally, the communication device 600 may be the terminal device of the embodiment of the disclosure, and the communication device 600 may implement the corresponding procedure implemented by the terminal device in each method of the embodiment of the disclosure, which is not repeated here for brevity.

Figure 11:
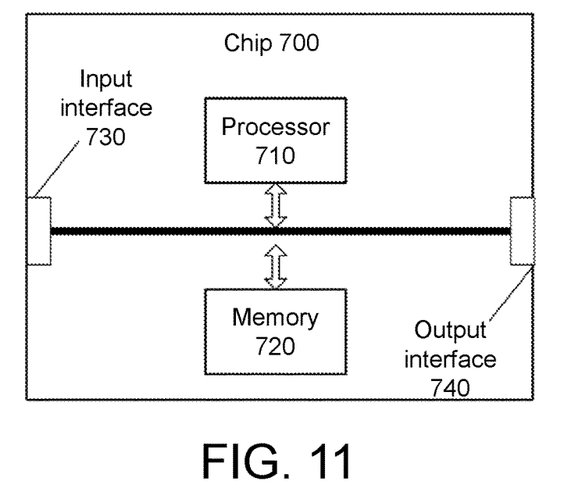
FIG. 11 is a schematic block diagram of a chip according to an embodiment of the disclosure.

FIG. 11 is a schematic structural diagram of a chip 700 according to an embodiment of the disclosure. The chip 700 shown in FIG. 7 includes a processor 710. The processor 710 may call and run a computer program from a memory to implement the method in the embodiment of the disclosure.

Optionally, as shown in FIG. 11, the chip 700 may further include a memory 720. The processor 710 may call and run a computer program from the memory 720 to implement the method in the embodiment of the disclosure.

The memory 720 may be a separate device independent of the processor 710 or may be integrated in the processor 710.

Optionally, the chip 700 may further include an input interface 730. The processor 710 may control the input interface 730 to communicate with other devices or chips, specifically, to obtain information or data sent by other devices or chips.

Optionally, the chip 700 may further include an output interface 740. The processor 710 may control the output interface 740 to communicate with other devices or chips, specifically, to output information or data to other devices or chips.

Optionally, the chip may be applied to the network device in the embodiment of the disclosure, and the chip may implement the corresponding procedure implemented by the network device in each method of the embodiment of the disclosure, which is not repeated here for brevity.

Optionally, the chip may be applied to the terminal device in any of the embodiments in FIG. 6 to FIG. 9 of the disclosure, and the chip may implement the corresponding procedure implemented by the terminal device in each method of the embodiment of the disclosure, which is not repeated here for brevity.

It should be understood that the chip mentioned in the embodiment of the disclosure may also be referred to as a system-level chip, a system chip, a chip system, a system-on-chip chip, etc.

The processor may be a general processor, a digital signal processor (DSP), a field programmable gate array (FPGA), an application specific integrated circuit (ASIC), other programmable logic devices, transistor logic devices, discrete hardware components, etc. The general processor may be a microprocessor, any conventional processor, etc.

The memory may be a volatile memory or a non-volatile memory or may include both volatile and non-volatile memories. The non-volatile memory may be a read-only memory (ROM), a programmable ROM (PROM), an erasable PROM (EPROM), an electrically EPROM (EEPROM), or a flash memory. The volatile memory may be a random access memory (RAM).

It should be understood that the memory is an exemplary but non-limiting description. For example, the memory in the embodiment of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), etc. In other words, the memory in the embodiment of the disclosure is intended to include but not limited to these and any other suitable types of memories.

Figure 12:
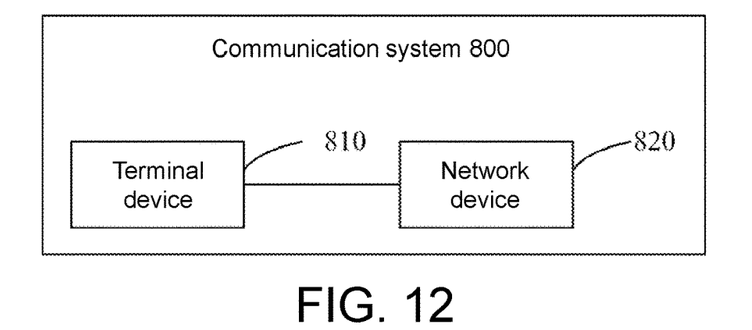
FIG. 12 is a schematic block diagram of a communication system according to an embodiment of the disclosure.

FIG. 12 is a schematic block diagram of a communication system 800 according to an embodiment of the disclosure. As shown in FIG. 12, the communication system 800 includes a terminal device 810 and a network device 820.

In a non-contention random access procedure satisfying a predetermined condition, after the terminal device 810 receives a random access response (RAR), if there is no data to be uplink transmitted, the terminal device 810 does not perform uplink transmission.

The terminal device 810 may be configured to implement the corresponding function implemented by the terminal device in the method of the embodiment of FIG. 4 or FIG. 5, and the network device 820 may be configured to implement the corresponding function implemented by the network device in the method. For brevity, details are not repeated here.

The above embodiments may be implemented in whole or in part by software, hardware, firmware, or any combination thereof. When implemented by software, the embodiments may be implemented in whole or in part in the form of a computer program product. The computer program product includes one or more computer instructions. When the computer program instruction is loaded and executed on a computer, all or part of the procedure or the function described in the embodiment of the disclosure is generated. The computer may be a general computer, a dedicated computer, a computer network, or other programmable apparatuses. The computer instruction may be stored in a computer-readable storage medium or transmitted from one computer-readable storage medium to another computer-readable storage medium. For example, the computer instruction may be transmitted from a website site, a computer, a server, or a data center through a wired (for example, a coaxial cable, an optical fiber, and a digital subscriber line (DSL)) or wireless (for example, infrared, wireless, microwave, etc.) manner to another website site, computer, server, or data center. The computer-readable storage medium can be any available medium that can be accessed by a computer or a data storage device such as a server and a data center that contains one or more available media integrated. The available medium may be a magnetic medium (for example, a floppy disk, a hard disk, and a magnetic tape), an optical medium (for example, a DVD), a semiconductor medium (for example, a solid state disk (SSD)), etc.

It should be understood that in various embodiments of the disclosure, the numbering of the sequence numbers of each procedure does not mean the order of execution, and the order of execution of each procedure should be determined by the function and internal logic thereof, and should not constitute any limitation to the embodiment of the disclosure.

Persons skilled in the art may clearly understand that for the convenience and brevity of description, for the specific working procedures of the system, the apparatus, and the unit described above, reference may be made to the corresponding procedure in the embodiment of the method, which is not repeated here.

The above are only specific implementations of the disclosure, but the protection scope of the disclosure is not limited thereto. Persons skilled in the art may easily think of changes or replacements within the technical scope disclosed by the disclosure, which should be covered within the protection scope of the disclosure. Therefore, the protection scope of the disclosure shall be defined by the protection scope of the claims.

What is claimed is:

1. A method for processing a random access procedure, applied to a terminal device, the method comprising:
in a non-contention random access procedure satisfying a predetermined condition, after receiving a random access response (RAR), if there is no data to be uplink transmitted, not performing uplink transmission,
wherein the predetermined condition comprises that the non-contention random access procedure is initiated by a physical downlink control channel (PDCCH) order, wherein the data to be uplink transmitted comprises at least one of uplink data that the terminal device needs to send medium access control (MAC) control element (CE), and padding data.

2. The method according to claim 1, wherein a random access preamble index indicated in the PDCCH order is not zero.

3. The method according to claim 1, wherein:
a medium access control (MAC) entity of the terminal device is configured to have a function of ignoring uplink transmission,
wherein not performing the uplink transmission comprises that the terminal device ignores the uplink transmission for an uplink (UL) grant indicated to an HARQ entity in the RAR,
wherein the UL grant indicated to the HARQ entity in the RAR is addressed to a random access radio network temporary identifier (RA-RNTI).

4. The method according to claim 1, wherein the method further comprises:
in response to the non-contention random access procedure triggered by a network device, sending, by the terminal device, a random access preamble to the network device;
receiving the RAR sent by the network device;
determining that a random access preamble identifier in the received RAR is consistent with a preamble index corresponding to the random access preamble sent to the network device.

5. The method according to claim 1, wherein:
a MAC entity of the terminal device is configured to have a skipUplinkTxDynamic field, and a value corresponding to the skipUplinkTxDynamic field is true.

6. The method according to claim 1, wherein the method further comprises:
not generating, by the MAC entity of the terminal device, a MAC protocol data unit (PDU) for the HARQ entity.

7. A method for processing a random access procedure, applied to a terminal device, a MAC entity of the terminal device being configured to have a skipUplinkTxDynamic field, and a value of the skipUplinkTxDynamic field being true;
the method comprising:
in a non-contention random access procedure satisfying a predetermined condition, after receiving a random access response (RAR), if there is no data to be uplink transmitted, not performing uplink transmission,
wherein the predetermined condition comprises that the non-contention random access procedure is initiated by a physical downlink control channel (PDCCH) order, wherein the data to be uplink transmitted comprises at least one of uplink data that the terminal device needs to send medium access control (MAC) control element (CE), and padding data;
in the random access procedure initiated by the PDCCH order whose random access preamble index is not zero, when a UL grant indicated to an HARQ entity is addressed to an RA-RNTI, not generating, by the MAC entity of the terminal device, a MAC PDU for the HARQ entity.

8. A terminal device, comprising:
a non-transitory memory, storing a computer program;
a transceiver;
a processor, coupled to the non-transitory memory cell and the transceiver, wherein the processor is configured to call and run the computer program from the memory to perform:
in a non-contention random access procedure satisfying a predetermined condition, after receiving a random access response (RAR), when that there is no data to be uplink transmitted, not performing uplink transmission,
wherein the predetermined condition comprises that the non-contention random access procedure is initiated by a physical downlink control channel (PDCCH) order, wherein the data to be uplink transmitted comprises at least one of uplink data that the terminal device needs to send medium access control (MAC) control element (CE), and padding data.

9. The terminal device according to claim 8, wherein a random access preamble index indicated in the PDCCH order is not zero.

10. The terminal device according to claim 8, wherein:
a medium access control (MAC) entity of the terminal device is configured to have a function of ignoring uplink transmission,
wherein the processor not performing the uplink transmission comprises that the processor ignores the uplink transmission for an uplink (UL) grant indicated to an HARQ entity in the RAR,
wherein the UL grant indicated to the HARQ entity in the RAR is addressed to a random access radio network temporary identifier (RA-RNTI).

11. The terminal device according to claim 8, wherein the processor is further configured to perform:
controlling the transceiver to send a random access preamble to a network device in response to the non-contention random access procedure triggered by the network device;
controlling the transceiver to receive the RAR sent by the network device;
determining that a random access preamble identifier in the RAR received by the transceiver is consistent with a preamble index corresponding to the random access preamble sent by the transceiver to the network device.

12. The terminal device according to claim 8, wherein:
a MAC entity of the terminal device is configured to have a skipUplinkTxDynamic field, and a value corresponding to the skipUplinkTxDynamic field is true,
wherein the processor is further configured to perform:
enabling the MAC entity of the terminal device to not generate a MAC protocol data unit (PDU) for the HARQ entity.

* * * * *